2,370,958
Patented Feb. 27, 1968

3,370,958
COMPOSITIONS COMPRISING SUCCINYL
HALF ESTERS
Ernest H. Freund, Evanston, Ill., assignor to National
Dairy Products Corporation, New York, N.Y., a corporation of Delaware
No Drawing. Original application Sept. 8, 1964, Ser. No. 395,013, now Patent No. 3,293,272, dated Dec. 20, 1966. Divided and this application Oct. 11, 1965, Ser. No. 494,912
10 Claims. (Cl. 99—91)

The present invention relates generally to half esters of succinic acid of a mono-acylated polyalcohol, having particular utility in baked goods and, more particularly, it relates to baked goods utilizing half esters of succinic acid of a mono-acylated polyalcohol.

This application is a divisional application of application Ser. No. 395,013 filed Sept. 8, 1964, Patent No. 3,293,272, which was a continuation-in-part of application Ser. No. 174,266 filed Feb. 19, 1962, the latter being now abandoned.

It is known that the addition of certain polyalcohol derivatives to edible fats and oils improves the properties of fats and oils in cakes, bread, and other baked goods. By way of example, the volume and texture of baked goods, which include liquid or plastic shortenings, are improved by the presence of mono- and diglycerides, and glycerol lacto palmitate.

It is known to add various chemical compounds, dough conditioners or other agents in connection with the baking of various goods and, generally, these materials have been added to provide improvement in the structural characteristics of the baked goods, such as their grain and texture, to provide softer or moister baked goods, or to provide baked goods of increased volume. Also, these materials have been added to improve the handling characteristics or machineability of the dough prepared for the baked goods. Generally, the previously known materials which have been added have not provided improvement in all of these characteristics, but have only provided improvement in one or two of these characteristics, or the material has provided an undesirable taste or flavor in the baked goods.

It is a primary object of the present invention to provide a half ester of succinic acid and of a mono-acylated polyalcohol. For convenience, these compounds of the invention will be referred to herein as "succinyl half esters." It is a more particular object of the present invention to provide semi-succinic acid esters of monoglyceride. This compound will be referred to herein as "succinylated mono-glyceride" (SMG).

A further object of this invention is the provision of succinyl half esters as improvers of baked goods and, more particularly, for improvement in baking bread.

An additional object of this invention is to provide succinyl half esters in combination with edible fats and oils, and particularly those fats and oils used in baking. In this connection, it is an object of this invention to provide an improved liquid shortening which includes succinyl half esters.

Another object is to provide succinyl half esters in combination with other food emulsifiers in the presence of fats or oils used in baking.

A further object of the invention is to provide salts of succinyl half esters and a more particular object is to provide such salts which are water soluble.

It is another object of this invention to provide the succinyl half esters in such form as to more readily improve baking properties in various formulations.

A still further object of this invention is the provision of processes for making succinyl half esters.

Other objects and advantages of the present invention will be come apparent by reference to the following description.

The compound of this invention is a half ester of succinic acid and of a mono-acylated polyhydric alcohol, or its salt. This compound or its salt may be represented by the following general formula:

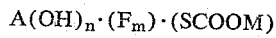

in which compound F is a residue of an even numbered, straight chain saturated fatty acid having from 14 to 24 carbon atoms; SCOO is the succinic acid residue or the salt thereof; A is a residue of a polyhydric alcohol having a straight chain length of from 2 to 6 carbon atoms; $m$ is equal to 1; $n$ is a number from zero to 4; and M is hydrogen, an edible alkali metal or alkaline earth.

In the preferred embodiment, stearic acid is the fatty acid residue in the compound of this invention, but myristic, palmitic and behenic acids provide satisfactory residues. The fatty acid residue should be substantially completely hydrogenated and the unsaturated fatty acid residues, such as oleic and linoleic acid residues, have not been found to be effective compounds for purposes of this invention. Also, in the preferred embodiment, the polyhydric alcohol residue is a glycerol residue, thus providing a free hydroxyl group on the glycerol residue. However, a propylene glycol residue in the compound of the invention provides a compound having no free hydroxyl group and which is a satisfactory compound. On the other hand, sorbitol or sorbitan provide compounds having two or more free hydroxyl groups and which are satisfactory compounds.

In the preparation of the succinyl half esters, succinic acid is preferably utilized in its anhydride form. The preparation of the compound of this invention is controlled to provide a low degree of polymerization and to maximize the half ester content of the succinyl half ester.

If the reactants utilized in the preparation of succinyl half esters are substantially pure and the preferred conditions for reaction are utilized then the resulting product will be predominantly succinyl half ester. On the other hand, if the reactants are not substantially pure and/or the preferred reaction conditions are not employed, then some byproducts are formed thereby providing a mixture. The compound of the invention has been found to be effective regardless of the presence of such byproducts as saturated and unsaturated triglyceride compounds, full or neutral esters and di-acylated polyhydric alcohol derivatives. These byproducts have been found to have little functional activity in baked goods and the mixture must be added in such amounts as to provide a sufficient amount of the succinyl half ester.

The succinyl half esters with a free hydroxyl group have low solubility in vegetable oil at room temperature while the succinyl half esters of propylene glycol are much more soluble in oil at room temperature. The succinyl half esters may be solubilized in oil at elevated temperatures above the melting point of the succinyl half esters.

However, all of the succinyl half esters have low solubility in water at room temperature. The water solubility of the succinyl half esters can be very substantially increased by forming alkali salts of the succinyl half esters. These salts provide several advantages in the utilization of the succinyl half esters in baking.

The succinyl half esters can be slurried in water, preferably in the presence of a coemulsifier. In this connection, I have found that ionic surfactants are effective coemulsifiers, in minor amounts, to provide a slurry of succinyl half esters. Such ionic surfactants are soap, e.g., sodium stearate, and sodium salts of succinylated monoglyceride. I have also found that nonionic emulsifiers, e.g. monoglycerides, sucrose monopalmitate, and polyethoxylated stearic acid, are not particularly effective for providing slurries of the succinyl half esters.

In the preparation of the succinyl half esters, the mono-acylated polyhydric alcohol can be prepared by esterification of the polyhydric alcohol, e.g., glycerol, with a fatty acid having an even chain length of from 14 to 24 carbon atoms, which is preferably stearic acid. In this connection, the fatty acid is reacted with the polyhydric alcohol under such conditions that the polyhydric alcohol is present in a substantial excess in order to assure provision of a preponderance of monoacylated compound.

It will be understood that various amounts of di-esters or tri-esters of the higher fatty acid and polyhydric alcohol may be present with the mono-esters. I have found that the presence of these polyester compounds does not provide compounds or derivatives which are functional to improve the overall baking properties. Since, in an equilibrium reaction, the esterification will provide about 60 percent mono-acylated ester and about 35 percent of the di-acylated ester, the reaction mixture desirably is molecularly or otherwise distilled to enrich the mixture in mono-acylated ester. The succinyl half ester is desirably prepared with a mono-acylated ester content of not less than about 50 percent and, preferably, the succinyl half esters are prepared with molecularly distilled mono-acylated ester wherein the mono-acylated ester is present at a level of at least about 90 percent.

The mono-acylated ester of the polyhydric alcohol is then preferably reacted with succinic anhydride, although succinic acid may be used, under suitable conditions. These reaction conditions are so controlled as to provide maximum amounts of the half ester of the acid, as distinguished from the full or neutral ester, and to minimize polymerization. This control is effected by measurement of the acid number and by termination of the reaction when the acid number is about one-half of the original acid number of the reactants. In this connection, each molecule of the succinic anhydride is reacted with one molecule of the mono-acylated polyhydric alcohol at one of its hydroxyl groups. If the reaction conditions are not suitably controlled, the free carboxyl groups on the half ester are reduced and the yield of the succinyl half ester is reduced.

For economic purposes, the half ester content of the mix produced by the reaction should be at least equal to the full or neutral ester content of the mixture. Thus, the mixture of esters should comprise at least about 50 percent succinyl half ester.

The succinyl half esters may be added at various points in the preparation of baked goods and it has been found that they are functional in baked goods, whether or not other fatty substances are present. Thus, the succinyl half esters may be added in the preparation of baked goods, in the presence or absence of fat. It has been found possible to add the succinyl half esters to the flour which is used in the preparation of baked goods, but, of course, the succinyl half esters may be added to fats or oils used in the preparation of baked goods. In addition, the succinyl half esters and particularly the salts of the succinyl half esters may be added to aqueous ingredients utilized in the preparation of baked goods.

The succinyl half esters have been found useful in shortenings and can be added to a fat or oil having plastic flow characteristics or having Newtonian flow characteristics. In this connection, a shortening may be prepared by adding the succinyl half ester to a liquid oil, such as cottonseed oil, soybean oil, or peanut oil, and also by adding to such oil a hard fat, such as cottonseed stearine, and/or an emulsifier like mono-glycerides and lactylated glycerides.

The level of the succinyl half ester in the shortening should be such as to provide functional amounts in the baked goods in which the shortening is used. In liquid shortening, it has been found that, in the absence of other emulsifying materials, the succinyl half esters of monoacylated proplyene glycol, which are the only succinyl half esters having substantial solubility in oil, may be used at levels up to the level of their solubility and to give functionality are present in the oil at levels of more than 3.5 percent. When co-emulsifiers are present, the other succinyl half esters may be incorporated into the oil and improved cake baking results have been observed. The combination of the succinyl half ester and its co-emulsifier should comprise at least about 4 percent of the liquid oil.

It has also been found that improved cake baking results are achieved when the succinyl half ester is present in plastic shortenings at levels of at least about 2 percent, when it is present in the absence of coemulsifiers, but it has also been found that lesser amounts of succinyl half esters may be employed when coemulsifiers are used, provided that the mixture of succinyl half ester and coemulsifier is present in plastic shortening at a level of at least about 2 percent.

In bread baking, it has been found that the presence of .1 percent of the succinyl half ester in bread, based upon the weight of flour, provides improved grain and texture and when it is present in bread at levels in excess of .2 percent, based upon the weight of flour, there is improved softness and a moister bread product is provided.

The presence of the succinyl half ester has also been found to provide improved machineability of bread dough and increased bread volume. In addition, the succinyl half ester, when used in bread dough, does not give any undesired taste or flavor to bread. Certain doughs, for example dietary bread dough, have been prepared without utilizing fat and it has been found that the succinyl half ester provides improvement in the grain, texture, softness, and volume. In this instance, of course, the succinyl half ester functions independently and effectively in the fat-free dough.

As above indicated, the succinyl half ester provides improvements in cake and bread baking and, generally, will be used after it is incorporated in the shortening, whether liquid or plastic shortening. However, the alkali salts of the succinyl half ester may be added to flour in the preparation of cakes.

As above indicated, the succinyl half esters should not provide a noticeable flavor in baked goods and should be bland in flavor. While effective succinyl half esters can be prepared in various ways and washed or treated, it has been extremely difficult to provide a bland flavored product. I have discovered a particular method for manufacturing the succinyl half ester which provides a bland flavored product and which product can be used in baked goods without imparting any undesired flavor.

I have found that a substantially bland tasting succinyl half ester may be prepared when the reaction between the mono-acylated polyhydric alcohol and succinic anhydride is carried out at a temperature below the melting point of succinic anhydride. While the exact reason for providing this bland taste is not wholly understood, it is believed that when the reaction temperature is maintained below the melting point of the succinic anhydride, undesired self-condensation of the succinic anhydride leading to the formation of hydrochelidonic acid, or its anhydride, is avoided.

In carrying out this process, the mono-acylated polyhydric alcohol, such as a monoglyceride, is heated to a temperature sufficient to melt the mono-acylated polyhydric alcohol, but, after it is melted, the temperature should be adjusted to below the melting point of succinic anhydride which is then suspended in the molten monoacylated polyhydric alcohol. The reaction commences under heterogeneous phase conditions and the phases change to a homogeneous mass as the reaction proceeds to completion.

The reaction is preferably effected under an inert atmosphere with stirring and the reaction is allowed to proceed to completion of the half ester or until the free succinic anhydride is used up. The mono-acylated polyhydric alcohol and succinic anhydride react in substantially equimolar concentrations. However, the mono-acylated polyhydric alcohol may be present in some excess, and the excess acts as diluent. In order to limit formation of reactions which may result in undesired flavors, the reaction is carried out at a temperature below about 115 degrees C., but above the melting point of the mono-acylated polyhydric alcohol.

As above pointed out, the reaction is preferably carried out under conditions of agitation and under an inert atmosphere, such as a nitrogen atmosphere, until a clear homogeneous melt is obtained and the succinic anhydride is substantially completely reacted. In the case of reacting a mono-stearine with succinic anhydride, the reaction proceeds until an acid number of less than 135, and preferably less than 125, is obtained. In general, an acid number of less than 125 is obtained after a period of about ¼ to 3 hours. The clear melt reaction product may be spray chilled, or otherwise cooled to room temperature.

The reaction between the mono-acylated polyhydric alcohol and succinic anhydride at low temperature, for example, those below 95 degrees C., are advantageously accelerated by the presence of a catalyst in the reaction mixtures. Generally, at temperatures above about 95 degrees C., the reaction can be carried out in reasonable times without the presence of a catalyst. I have found an effective catalyst to include the cations of alkali metals and/or alkaline earths. In general, any soluble salt whose anions are not deleterious to the succinyl half ester may be employed. Particularly suitable catalysts include alkali metal carbonates, alkali metal and alkaline earth soaps, alkali and alkaline earth succinates and alkali metal and alkaline earth salts of succinylated monoglyceride.

The catalyst is employed in a minor amount, but will be present in an amount from .05 percent to about 2 percent by weight of the reaction mixture. While greater amounts of catalyst can be employed, there is not a great improvement in the reaction. The catalyst has been found most effective at levels from about .1 percent to about 1 percent.

The catalyst may be added to the reaction mixture before, during, or after the succinic anhydride is added to the molten mono-acylated polyhydric alcohol. However, the preferred method contemplates addition of the catalyst to the reaction mixture during or after the addition of succinic anhydride.

In the following are set forth various examples in respect to the succinyl half ester and their use in baked goods.

*Example I*

As an example of the preparation of the succinyl half ester for use in the present invention, it is prepared by taking 1,000 parts of hydrogenated lard mono-glyceride, comprising 92 percent mono-glyceride, and placing it in a vessel equipped with an agitator and a nitrogen purge line. The mono-glyceride is heated to about 120 degrees C., and vacuum is applied for a short time to remove free moisture.

240 parts of succinic anhydride is added to the flask with agitation, and the flask is purged with nitrogen. The heat of reaction and added heat caused the temperature of the reaction mass to rise to about 165 degrees C. The reaction mass is maintained at 165 degrees C. for about 30 minutes, whereupon it is cooled to about 80 degrees C.

25 parts of a 50 percent aqueous solution of potassium carbonate is added to the reaction mass, and the mixture is stirred rapidly. The mixture is then exposed to a vacuum of 30 mm. of Hg and stirred for 15 minutes in order to remove free moisture.

The reaction product has the following analysis:

| | |
|---|---|
| Acid number, mg. KOH/g. | 91.2 |
| Saponification number mg. KOH/g. | 333.3 |
| Melting range, °C. | 51–58 |
| Iodine value, Wiijs | 0.4 |
| Free succinic acid anhydride, weight percent | Nil |
| Total bound succinic anhydride, weight percent | 17.3 |
| Succinic anhydride bound as semiester, weight percent | 15.0 |
| Succinic anhydride bound as neutral ester, weight percent | 2.3 |

*Example II*

As an additional example of the succinyl half ester in accord with the present invention, 1,000 parts of distilled hydrogenated lard mono-glyceride, I.V. about 1, comprising 92 percent mono-glycerides, 8 per cent di-glycerides, and a small amount of tri-glycerides, is charged into a 100 gallon stainless steel reactor equipped with an agitator and a steam-heated jacket. The mono-glyceride is heated to 120 degrees C., and the reactor is partially evacuated to remove free moisture from the mono-glyceride.

The reactor is purged with nitrogen, and 260 parts of succinic anhydride is added rapidly with agitation. The resultant heat of reaction and added heat causes the temperature of the reaction mass to rise to about 160 degrees C., and this temperature is maintained for about 2 hours.

The reaction product is then cooled to about 80 degrees C., and 70 parts of a 50 percent aqueous solution of potassium carbonate is added with agitation. Mixing of the reaction product with the aqueous solution is continued for about 3 minutes at 80 degrees C.

The reactor is then evacuated to a pressure of about 30 mm. of mercury to remove free moisture, and held at this pressure for about 15 minutes while the reaction product is agitated. The reaction product is thereafter pumped from the reactor and spray chilled to provide free-flowing powder.

The reaction product has the following analysis:

| | |
|---|---|
| Acid number, mg. KOH/g. | 76.5 |
| Saponification number, mg. KOH/g. | 336.0 |
| Melting range, °C. | 54–59 |
| Iodine value, Wiijs | 0.4 |
| Free succinic anhydride, weight percent | Nil |
| Total bound succinic anhydride, weight percent | 17.6 |
| Succinic anhydride bound as semiester, weight percent | 13.7 |
| Succinic anhydride bound as neutral ester, weight percent | 3.9 |

*Example III*

As an additional example of the preparation of succinyl half ester in accord with the present invention, 1,000 parts of hydrogenated lard mono-glyceride, comprising 92 percent mono-glyceride, is placed in a vessel equipped with a stirrer and a nitrogen purge line. The mono-glyceride is melted by heating the flask to about 120 degrees C., and vacuum is applied to the flask for a short time to remove free moisture.

180 parts of succinic anhydride is added to the flask with agitation, and the flask is purged with nitrogen. External heat plus the heat of reaction causes the temperature of the reaction mass to rise to about 140 degrees C. The reaction mass is maintained at this temperature for about 30 minutes, whereupon it is cooled to about 80 degrees C., and mixed with 45 parts of a 50 percent aqueous solution of potassium carbonate.

After mixing, the free moisture is removed from the flask by vacuum, and the resultant reaction product is flaked to provide a chipped product. There is obtained a reaction product having the following analysis:

| | |
|---|---|
| Acid number, mg. KOH/g. | 74.0 |
| Saponification number mg. KOH/g. | 301.4 |
| Melting range, ° C. | 52–56 |
| Iodine value, Wiijs | 0.6 |
| Free succinic acid anhydride, weight percent | Nil |
| Total bound succinic anhydride, weight percent | 13.9 |
| Succinic anhydride bound as semiester, weight percent | 13.2 |
| Succinic anhydride bound as neutral ester, weight percent | 0.7 |

*Example IV*

As a further example of the preparation of the half ester for use in the mixture of the invention, 5,000 grams of hydrogenated lard mono-glyceride, comprising 92 percent mono-glyceride, was placed in a 12 liter three-necked flask provided with a stirrer and nitrogen purge line. The product was heated to melt it and free moisture was removed by application of vacuum. 1300 grams of succinic anhydride was added, with agitation, under a nitrogen blanket. Ten minutes were utilized in adding the succinic anhydride and, after such addition, the flask was controlled at 145–150 degrees C. for 45 minutes. At the end of this period, the resulting product was cooled and solidified by pouring it into porcelain pans.

The reaction product had the following analysis:

| | |
|---|---|
| Acid number, mg. KOH/g. | 106.4 |
| Saponification number, mg. KOH/g. | 357.5 |
| Iodine value, Wiijs | 0.5 |

*Example V*

As an additional example of the preparation of the half ester, 972 grams of propylene glycol monostearate (comprising 85 percent monoester) was placed in a flask equipped with a stirrer and a nitrogen purge line. The monostearate was melted, and vacuum was applied to the flask to remove moisture.

240 grams of succinic anhydride, and 1.5 grams of potassium carbonate were added to the flask. The potassium carbonate was present to accelerate the reaction. The flask was purged with nitrogen, and the reaction mass was heated to 165 degrees C. with stirring. The reaction mass was held at 165 degrees C. for about 30 minutes.

The reaction product was removed from the flask and allowed to cool, and was thereafter suspended in about 10 liters of water. The suspension was heated with vigorous agitation at 65 degrees C., and was thereafter cooled with agitation.

The reaction product solidified in small particles, and was filtered from the water and air dried.

The reaction products of certain of the foregoing examples were evaluated by adding 2.5 percent of each reaction product to a commercial shortening comprising hydrogenated cottonseed oil and not including mono-glycerides or di-glycerides, and baking standard white cakes therefrom. These cakes were compared to control cakes, hereinafter called Control A, baked with a commercial shortening containing about 6.5 percent of mono- and di-glycerides. A second series of control cakes were also prepared, hereinafter called Control B, baked with a plastic shortening containing 2.5 percent glycerol lacto palmitate. A third series of control cakes was also prepared, hereinafter called Control C, with a plastic shortening containing 2.5 percent of molecularly distilled mono-glyceride (92 percent mono-glyceride) derived from hydrogenated lard.

The cakes comprising the reaction product of the present invention and the control cakes were prepared in accordance with the following ingredients:

| | Parts |
|---|---|
| Flour | 41.9 |
| Sugar | 52.1 |
| Salt | 1.0 |
| Baking powder | 2.5 |

To 48.7 parts of the foregoing dry mix there was added 10.0 parts of the shortening and 16.0 parts of fluid whole milk. The dry mix, shortening, and milk were blended well, and to the blend was added a wet mix comprising 12.0 parts of egg whites and 8.0 parts of fluid whole milk. The resultant mixture was blended to provide a satisfactory batter, and the specific gravity of the batter was measured.

420 grams of the batter was placed in an eight inch cake pan and baked at a temperature of 350 degrees F. After baking, the volume of the cake was measured, and the cake profile was determined.

In this connection, the cake profile was determined by measuring the height of the cake at three points along the diameter of the cake. A cake was considered to have a desirable profile, if the cake height was substantially uniform across its diameter, indicating that the cake neither had a central depression nor an excessive central hump.

The grain and texture of each of the cakes was also observed.

Table 1 summarizes the results of the foregoing evaluations:

TABLE 1.—BAKING PERFORMANCE WITH PLASTIC SHORTENING

| Cake Designation | Batter, sp. gr. | Cake Volume, cc. | Cake Grain and Texture | Cake Profile |
|---|---|---|---|---|
| Control A | 0.89 | 1,180 | Fine | 22-26-24 |
| Control B | 0.82 | 1,080 | Fine, Close | 21-24-21 |
| Control C | 0.83 | 1,110 | do | 22-26-22 |
| Example I | 0.92 | 1,220 | Good | 25-26-24 |
| Example II | 0.94 | 1,180 | do | 24-25-24 |
| Example III | 0.91 | 1,210 | do | 25-25-24 |
| Example IV | 0.88 | 1,300 | Fine | 25-26-25 |

It will be seen from Table 1 that cakes prepared by utilizing the reaction products (2.5%) of Examples I through IV had volumes substantially equivalent to Control A cakes, comprising a shortening containing 6.5 percent of mono- and di-glycerides. It will also be seen that the volume of cakes comprising the reaction product of the present invention were substantially greater than the volumes of Control B and C cakes, comprising, at corresponding levels, glycerol lacto palmitate, and distilled mono-glycerides, respectively.

Cakes comprising the half ester had good flavor and eating quality. In addition, it will be seen that they had excellent profiles, in comparison with any of the control cakes.

The reaction product of Examples II and IV were also evaluated by adding the reaction product to a liquid vegetable oil at the below-indicated percentages with 2.5 percent hydrogenated (I.V. less than 1) fish oil mono- and di-glycerides (comprising about one-third $C_{20}$ or greater fatty acid radicals in the mono-glycerides), and baking the standard white cake comprising the resultant mixture. The procedure used in preparing the cake was identical to the procedure set forth hereinbefore. Table 2 summarizes the results of this evaluation.

TABLE 2.—BAKING PERFORMANCE WITH LIQUID SHORTENING

| Example | Percent Reaction Product | Batter, sp. gr. | Cake Volume, cc. | Cake Grain and Texture | Cake Profile |
|---|---|---|---|---|---|
| II | 2.0 | 0.88 | 1,210 | Very good | 23-25-24 |
| IV | 2.5 | 0.84 | 1,320 | Fine | 25-26-24 |

It will be seen that the resultant cakes had volume, profile, grain and texture comparable to the best control cakes set forth in Table 1. In addition, the cakes had excellent eating qualities, being tender and moist.

Cakes baked in accordance with any of the foregoing liquid shortening examples utilizing 2.5 percent glycerol lacto palmitate in place of the fish oil monoglycerides are also of excellent quality, with good grain and texture, volume and profile.

The presence of long chain length saturated monoglycerides provides liquid shortenings with excellent properties. In this connection, it has been found that chain length greater than $C_{18}$ gives superior results.

*Example VI*

In accordance with this example, a succinyl half ester of mono-behenin is prepared. In the preparation of the succinyl half ester 98 grams of distilled mono-behenin was reacted with 24 grams of succinic anhydride at a temperature of 170° C. for 45 minutes. At the end of the reaction, the acid number of the product was 98.5. The product of the reaction was washed with water at 85 degrees C. and the reaction was dried and resulted in a hard waxy product having a melting point of 80-85 degrees C. The acid number of the product, after washing, was 74.

A liquid shortening was prepared with the succinyl half ester by dissolving it in refined cottonseed oil at a level of 2.5 percent. In addition, 2.5 percent of hardened fish oil monoglycerides was also dissolved in the cottonseed oil. Dissolution of the succinyl half ester and the monoglycerides was effected at 165 degrees F. and, after dissolution, the mixture was stirred in an ice bath until the temperature had dropped to 50 degrees F. The liquid shortening was then tempered for 72 hours at 98 degrees F.

This liquid shortening was compared to a like shortening, except that the succinyl half ester of mono-behenin was replaced by a succinyl half ester of mono-stearin. Cakes baked with each of these liquid shortenings were excellent and were comparable.

*Example VII*

In accordance with this example, a succinyl half ester is prepared under low temperature conditions, i.e., below the melting point of succinic anhydride. 16,000 grams of distilled mono-stearin (Myverol 1800) were melted in a three-necked flask equipped with a stirrer. The temperature of the mono-stearin was adjusted to 80 degrees C. After melting, the mono-stearin was subjected to a vacuum for a short time to remove moisture. A nitrogen blanket was established over the melt and 4,000 grams of succinic anhydride and 80 grams of potassium stearate were added. A heterogeneous mixture of a liquid and solid phase was formed and was stirred. The temperature was controlled at 80 degrees C. and, 1 hour and 30 minutes after the addition of the succinic anhydride, the solution became homogeneous. The reaction was allowed to proceed for 15 additional minutes, whereupon the solution was cooled to 70 degrees C. and spray chilled through a nozzle under a pressure of 30 p.s.i.g. into a fine powder which had an average particle size of 30 microns. The reaction product had an acid number of 116.4 and a Fischer-John melting point of 59-62 degrees C. The reaction product contained 1.7 percent of free succinic acid and less than 50 parts per million (p.p.m.) of succinic anhydride.

A liquid shortening was prepared by taking 57.5 pounds of winterized cottonseed oil which had been deodorized for one hour at 510 degrees F. During cooling of the oil, citric acid was introduced to a concentration of .01 percent, when the oil temperature was at about 320 degrees F. To this oil was added 3 pounds of an emulsifier melt at 250 degrees F. The emulsifier melt comprised 1.5 pounds of the above-prepared succinyl half ester, 1.35 pounds of glycerol lacto palmitate and .15 pounds of distilled mono-stearin (Myverol 1807). The emulsifier melt at about 250 degrees F. was added to the oil and the temperature of the resulting mixture was maintained at 220-250 degrees F. for about 10 minutes. This temperature was then dropped to 150 degrees F. and the liquid shortening was placed in a kettle and held, with slow agitation, at 92 degrees F. for one hour. An antioxidant was added to the liquid shortening, the antioxidant being Tennox IV, at a level of .5 percent. The liquid shortening was passed through a swept surface heat exchanger and exited at a temperature of about 50 degrees F. The liquid shortening was filled into glass jars. The liquid shortening was utilized in the preparation of high ratio cakes and produced cakes of high volume with good crusts and grain. There was no flavor detected in either the shortening or the cakes, which could be attributed to the presence of undesirable condensation products of succinic anhydride.

*Example VIII*

A number of samples of succinyl half ester were prepared at various reaction temperatures and with various catalytic conditions. Each sample was prepared by melting 500 grams of mono-stearin sold under the trade name "Myverol 1800." This product comprises at least about 90 percent monoglyceride. Each sample was introduced into a three-necked flask provided with a mechanical agitator, temperature control means, and an inlet and outlet for nitrogen gas in order to conduct the reaction in the flask under inert conditions. The mono-stearin was melted and the temperature adjusted to a temperature below the melting point of succinic anhydride, as set forth in Table 3. As also set forth in Table 3, the catalyst was added at a particular level and 125 grams of succinic anhydride was also added. The molar ratio of mono-stearin to succinic anhydride was about 1:.95.

The time of reaction was measured from the time of addition of the catalyst and the end point of the reaction was determined by substantial disappearance of the succinic anhydride. After completion of the reaction, the reaction mixture was poured into a cooling pan and allowed to cool to room temperature. The results of the reaction are set forth in the following table:

TABLE 3

| Sample | Catalyst, percent of monostearin | Reaction Temperature, °C. | Reaction Time, minutes | Acid Number of Product |
|---|---|---|---|---|
| 1 | 0.1% $K_2CO_3$ | 110 | 70 | 116 |
| 2 | 0.4% $K_2CO_3$ | 100 | 120 | 120 |
| 3 | 0.1% $K_2CO_3$ | 90 | 100 | 127 |
| 4 | 0.1% $K_2CO_3$ | 80 | 45 | 130 |
| 5 | 0.1% $K_2CO_3$ | 80 | 105 | 121 |
| 6 | 0.2% $K_2CO_3$ | 80 | 85 | 119 |
| 7 | 0.2% potassium monosuccinate | 90 | 90 | 118 |
| 8 | 0.3% potassium monosuccinate | 90 | 95 | 122 |
| 9 | 0.5% potassium salt of monostearin half ester of succinic acid | 80 | 105 | 118.5 |
| 10 | 0.2% $Na_2CO_3$ | 80 | 80 | 122 |
| 11 | 0.3% calcium acetate | 80 | 130 | 132 |
| 12 | 1% calcium stearate | 80 | 120 | 124 |

A control sample was prepared at a reaction temperature of 115 degrees C. and the reaction proceeded to completion in 165 minutes. The end product had an acid number of 118. The control sample was prepared in the same way as the samples set forth in the above table.

*Example IX*

The succinyl half ester may be prepared in the presence of a diluent and, in this connection, the half ester was prepared by dissolving 400 grams of glyceryl mono-stearin in 800 grams of a winterized cottonseed oil. The dissolution was effected in a three-necked flask equipped with a stirrer at 80 degrees C. After effecting the dissolution, 100 grams of a succinic anhydride was added with 2 grams of the sodium salt of succinyl monoglyceride. The mixture was stirred under a nitrogen blanket and the temperature was controlled at about 82 degrees C.

After 1 hour and 45 minutes from the addition of the succinic anhydride, the mixture had become substantially homogeneous and the acid number was 55. After two hours and 15 minutes from the addition of the succinic anhydride, the acid number had dropped to 46.6 and the reaction was terminated. The mixture was passed through a swept surface heat exchanger and lowered in temperature to about 10 degrees C. The mixture was used in bread baking and gave bread of good volume, grain structure and softness.

*Example X*

Succinyl half ester of the invention was used in the preparation of breads which contained varying amounts of fat and varying amounts of the half ester. The breads were made in accordance with a standard procedure in which a sponge was first prepared and was added to a dough mix. After baking of the bread, the grain of the bread was examined and the specific volume was determined. In addition, the softness of the bread was determined 24 hours and 72 hours after baking. The softness of the bread was determined by the method of the American Association of Cereal Chemists entitled "Staleness of Bread—Compression of Firmness Test with Bloom Gelometer" (Cereal Laboratory Methods, 1959, 6th Edition, section 85.1b, p. 352. Published by American Association of Cereal Chemists, University Farm, St. Paul, Minn.). Lower values indicate softer bread. The results of the baking test with various compounds of this invention are set forth in the following table:

3. A liquid shortening comprising a half ester of succinic acid and of a mono-acylated polyhydric alcohol having the formula:

$$A(OH)_n \cdot (F_m) \cdot (SCOOH)$$

in which F is a residue of an even numbered, straight chain saturated fatty acid having from 14 to 24 carbon atoms, SCOO is the residue of succinic acid and A is a residue of a polyhydric alcohol having a straight chain length of from 2 to 6 carbon atoms, $m$ is equal to 1 and $n$ is a number from 0 to 4.

4. A liquid shortening comprising an edible oil and a half ester of succinic acid and of a mono-acylated polyhydric alcohol having the formula:

$$A(OH)_n \cdot (F_m) \cdot (SCOOH)$$

in which F is a residue of a saturated fatty acid having an even numbered carbon chain from 14 to 24 carbon atoms, SCOO is the residue of succinic acid and A is a residue of propylene glycol, $m$ is equal to 1 and $n$ is 1, said fatty compound being present in the liquid shortening at a level in excess of about 3.5 percent.

5. A dough product comprising a half ester of succinic acid and of a mono-acylated polyhydric alcohol having the formula:

$$A(OH)_n \cdot (F_m) \cdot (SCOOM)$$

in which F is a residue of an even numbered, straight chain saturated fatty acid having from 14 to 24 carbon atoms, SCOO is the residue of succinic acid and A is a residue of a polyhydric alcohol having a straight chain length of from 2 to 6 carbon atoms, $m$ is equal to 1, $n$

TABLE 4.—BREAD BAKING RESULTS

| Emulsifier Compound | Percent of Flour | | Grain | Specific Volume | Softness | |
| --- | --- | --- | --- | --- | --- | --- |
| | Lard | Emulsifier | | | 24 hours | 72 hours |
| 1. Succinyl Half Ester of Mono-stearin | .8 | .3 | Good | 5.78 | 118 | 193 |
| 2. Calcium Salt of Succinyl Half Ester of Mono-stearin | .8 | .3 | do | 5.72 | 140 | 230 |
| 3. Magnesium Salt of Succinyl Half Ester of Mono-stearin | .8 | .3 | do | 5.73 | 130 | 212 |
| 4. Succinyl Half Ester of Mono-stearin | 0 | .3 | do | 5.59 | 117 | 180 |
| 5. Succinyl Half Ester of Mono-stearin | 0 | .2 | do | 5.57 | 136 | 212 |
| 6. Succinyl Half Ester of Mono-stearin | 0 | .1 | do | 5.54 | 150 | 237 |
| 7. Sodium Salt of Succinyl Half Ester of Mono-stearin | 0 | .3 | do | 5.61 | 127 | 203 |
| 8. None | 0 | 0 | Poor | .48 | 164 | 278 |
| 9. None | 3 | .1 | Fair | 5.78 | 139 | 220 |
| 10. Succinyl Half Ester of Mono-stearin | 3 | .1 | do | 5.68 | 139 | 220 |
| 11. Succinyl Half Ester of Mono-stearin | 3 | .15 | do | 5.68 | 139 | 223 |
| 12. Succinyl Half Ester of Mono-stearin | 3 | .25 | Good | 5.63 | 128 | 204 |
| 13. Succinyl Half Ester of Mono-stearin | 3 | .5 | do | 5.78 | 111 | 168 |

It will be seen from the foregoing that new and unique compounds have been provided which have particular utility in respect to baked goods.

The various features of this invention which are believed to be new are set forth in the following claims.

What is claimed is:

1. A shortening comprising a half ester of succinic acid and of a mono-acylated polyhydric alcohol having the formula:

$$A(OH)_n \cdot (F_m) \cdot (SCOOM)$$

in which F is a residue of an even numbered, straight chain saturated fatty acid having from 14 to 24 carbon atoms, SCOO is the residue of succinic acid and A is a residue of a polyhydric alcohol having a straight chain length of from 2 to 6 carbon atoms, $m$ is equal to 1, $n$ is a number from 0 to 4, and M is hydrogen or an edible alkali metal or alkaline earth.

2. A shortening comprising a half ester of succinic acid and of a mono-acylated polyhydric alcohol having the formula:

$$A(OH)_n \cdot (F_m) \cdot (SCOOH)$$

in which F is a residue of stearic acid, SCOO is the residue of succinic acid and A is a residue of glycerol, $m$ is equal to 1 and $n$ is 1.

is a number from 0 to 4, and M is hydrogen or an edible alkali metal or alkaline earth.

6. A bread dough including flour comprising a half ester of succinic acid and of a monoacylated polyhydric alcohol having the formula:

$$A(OH)_n \cdot (F_m) \cdot (SCOOM)$$

in which F is a residue of stearic acid, SCOO is the residue of succinic acid and A is a residue of a polyhydric alcohol having a straight chain length of from 2 to 6 carbon atoms, $m$ is equal to 1, $n$ is a number from 0 to 4, and M is hydrogen or an edible alkali metal or alkaline earth, said fatty compound being present at a level in excess of about .1 percent, based upon the weight of flour.

7. A bread dough including flour comprising a half ester of succinic acid and of a monoacylated polyhydric alcohol having the formula:

$$A(OH)_n \cdot (F_m) \cdot (SCOOH)$$

in which F is a residue of stearic acid, SCOO is the residue of succinic acid and A is residue of glycerol, $m$ is equal to 1 and $n$ is 1, said fatty compound being present in bread at a level in excess of about .2 percent based upon the weight of the flour.

8. A plastic shortening comprising a half ester of succinic acid and of a mono-acylated polyhydric alcohol having the formula:

$$A(OH)_n \cdot (F_m) \cdot (SCOOH)$$

in which F is a residue of an even numbered, straight chain saturated fatty acid having from 14 to 24 carbon atoms, SCOO is the residue of succinic acid and A is a residue of a polyhydric alcohol having a straight chain length of from 2 to 6 carbon atoms, $m$ is equal to 1 and $n$ is a number from 0 to 4.

9. A plastic shortening comprising a half ester of succinic acid and of a mono-acylated polyhydric alcohol having the formula:

$$A(OH)_n \cdot (F_m) \cdot (SCOOH)$$

in which F is a residue of an even numbered, straight chain saturated fatty acid having from 14 to 24 carbon atoms, SCOO is the residue of succinic acid and A is a residue of a polyhydric alcohol having a straight chain length of from 2 to 6 carbon atoms, $m$ is equal to 1 and $n$ is a number from 0 to 4, said fatty compound being present at a level of at least about 2 percent.

10. A shortening comprising a half ester of succinic acid and of a mono-acylated polyhydric alcohol having the formula:

$$A(OH)_n \cdot (F_m) \cdot (SCOOH)$$

in which F is a residue of stearic acid, SCOO is the residue of succinic acid and A is a residue of glycerol, $m$ is equal to 1 and $n$ is equal to 1, in combination with a sodium salt of succinylated monoglyceride.

References Cited

UNITED STATES PATENTS

| | | | |
|---|---|---|---|
| 2,552,706 | 5/1951 | Bertram | 99—123 X |
| 3,145,107 | 8/1964 | Howard | 99—118 |
| 3,145,108 | 8/1964 | Howard | 99—118 |
| 3,145,109 | 8/1964 | Howard | 99—118 |

FOREIGN PATENTS 652,006   4/1951   Great Britain.

MAURICE W. GREENSTEIN, *Primary Examiner.*